United States Patent [19]
Ho et al.

[11] Patent Number: 6,038,235
[45] Date of Patent: Mar. 14, 2000

[54] FIBER CHANNEL AUTOMATIC ARBITRATION AND COMMUNICATION CONTROL

[75] Inventors: Kin M. Ho, Fremont; David C. Banks, Pleasanton; John C. Schell, Sunnyvale; Tai Quan, San Jose; Teshager Tesfaye, Mountain View, all of Calif.

[73] Assignee: Sun Microsystems, Inc., Palo Alto, Calif.

[21] Appl. No.: 08/915,135

[22] Filed: Aug. 20, 1997

[51] Int. Cl.[7] ........................................ H04J 3/02
[52] U.S. Cl. ........................... 370/462; 370/453; 370/457
[58] Field of Search ..................... 370/402, 453, 370/457, 461, 462, 463; 340/825.05, 825.5, 825.51; 709/103, 233, 250

[56] References Cited

U.S. PATENT DOCUMENTS

| | | | |
|---|---|---|---|
| 5,768,530 | 6/1998 | Sandorfi | 709/233 |
| 5,809,328 | 9/1998 | Nogales et al. | 709/233 |
| 5,944,798 | 8/1999 | McCarty et al. | 370/462 |

OTHER PUBLICATIONS

American National Standard for Information Technology, "Fibre Channel Arbitration Loop (FC–AL) Rev 4.5", Jun. 1, 1995.

*Primary Examiner*—Chi H. Pham
*Assistant Examiner*—Frank Duong
*Attorney, Agent, or Firm*—Beyer & Weaver, LLP

[57] ABSTRACT

A method for automatically arbitrating for mastership of a fiber channel loop in a host adapter circuit configured for coupling a host electronic device with the fiber channel loop. The host adapter circuit has a processor and a loop control circuit different from the processor. The loop control circuit is coupled to a memory of the host adapter circuit. The method includes sending out a host ARBITRATE primitive on the fiber channel loop. The method further includes employing the loop control circuit to monitor received ARBITRATE primitives received at the host adapter circuit from the fiber channel loop. There is also included ascertaining, using the loop control circuit, whether one of the received ARBITRATE primitives represents the host ARBITRATE primitive sent out previously. If the one of the received ARBITRATE primitives represents the host ARBITRATE primitive sent out previously, the method includes placing a target device coupled to the fiber channel loop in an OPENED state for receiving data from the host electronic device.

20 Claims, 6 Drawing Sheets

FIBER CHANNEL AUTOMATIC ARBITRATION AND COMMUNICATION CONTROL

CROSS REFERENCE TO RELATED PATENT APPLICATIONS

This patent application is related to the following copending, commonly assigned patent application, the disclosures of which is incorporated herein by reference in its entirety.

"IMPROVED COMMUNICATION CONTROLLERS AND METHODS THEREFOR," patent application Ser. No. 08/915,286, filed on even date by Ho et al.

BACKGROUND OF THE INVENTION

This invention relates generally to methods and apparatus for data communication on a fiber channel loop. More specifically, the present invention relates to improved apparatus and methods therefor that are capable of automatically arbitrating and establishing communication control on behalf of an electronic device on a fiber channel loop.

Fiber channel loops, essentially data-carrying fiber optic channels, have in recent times become the popular communication channels for exchanging data among electronic devices, such as between a computer and its peripheral devices and/or other computers in a network. By way of example, a fiber channel loop may be employed to communicate between a host computer system and its disk drives, among the disk drives, or even to carry internet protocol (IP) data.

Figure 1:
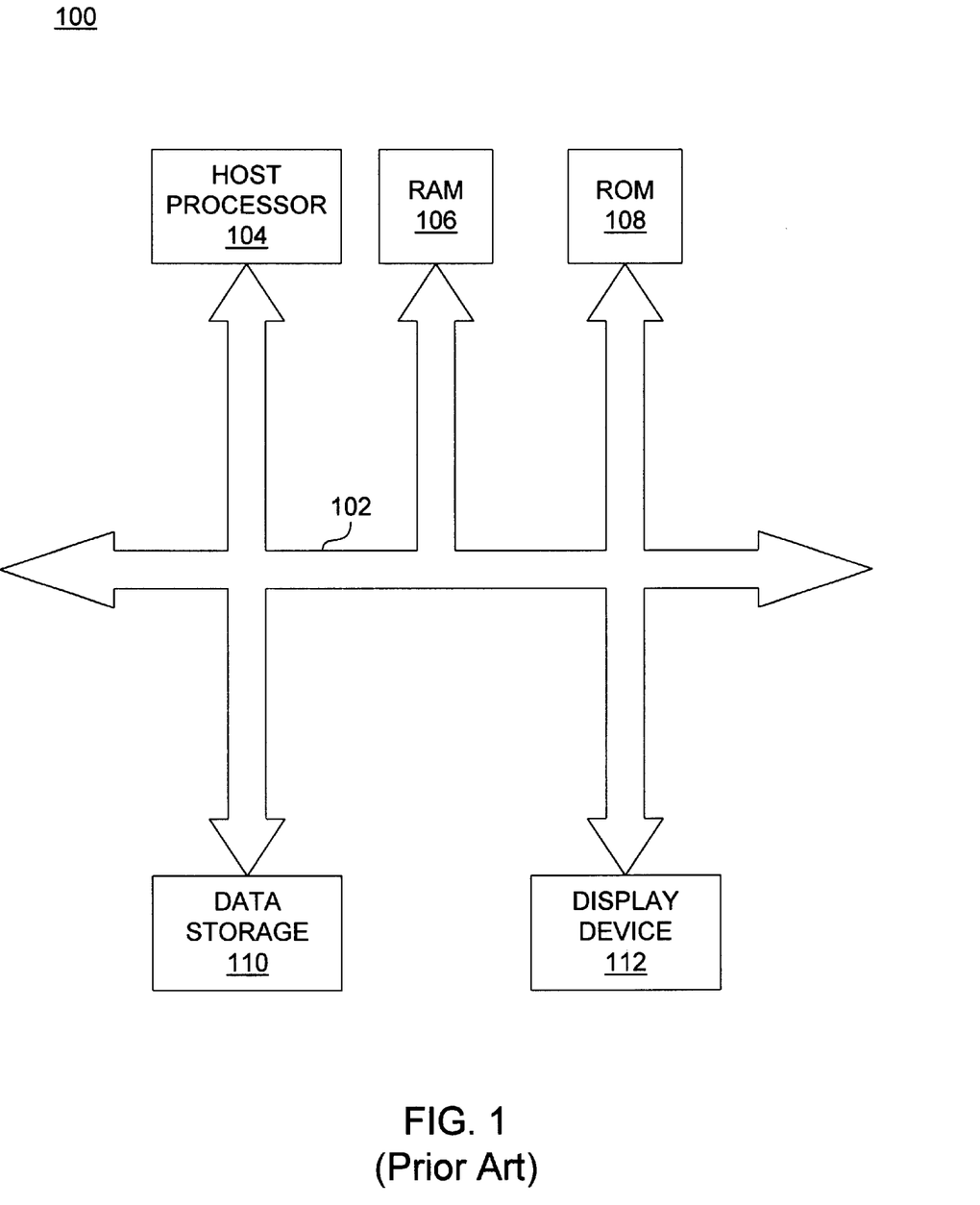
FIG. 1 is a block diagram of a host computer system, representing a host electronic device suitable for use with the inventive automatic arbitration and communication apparatus.

With reference to FIG. 1, a block diagram is shown of a host computer system 100, representing a computer which may be employed with a fiber channel loop. In general, host computer system 100 typically includes a bus 102 for communicating information among its subsystems and/or with the outside world. A host processor 104 is coupled with bus 102 for processing data and instructions. A computer readable volatile memory unit 106 (e.g. random access memory unit) may be coupled with bus 102 for temporarily storing data and instructions for host processor 104 and/or other subsystems of host computer system 100. A computer readable non-volatile memory unit 108 (e.g., read-only memory unit) may be coupled with bus 102 for storing nonvolatile data and instructions for host processor 104.

To provide high-capacity, nonvolatile storage, a computer readable data storage device 110 such as a magnetic or optical disk may also be provided. Data may be displayed to the user via a display device 112, which is coupled to bus 102 and may represent, for example, a liquid crystal device, cathode ray tube, or other display device suitable for creating graphic images and alphanumeric characters recognizable to the user. Components of host computer system 100 and its variants are well known to those skilled and will not be elaborated further here for brevity's sake.

Figure 2:
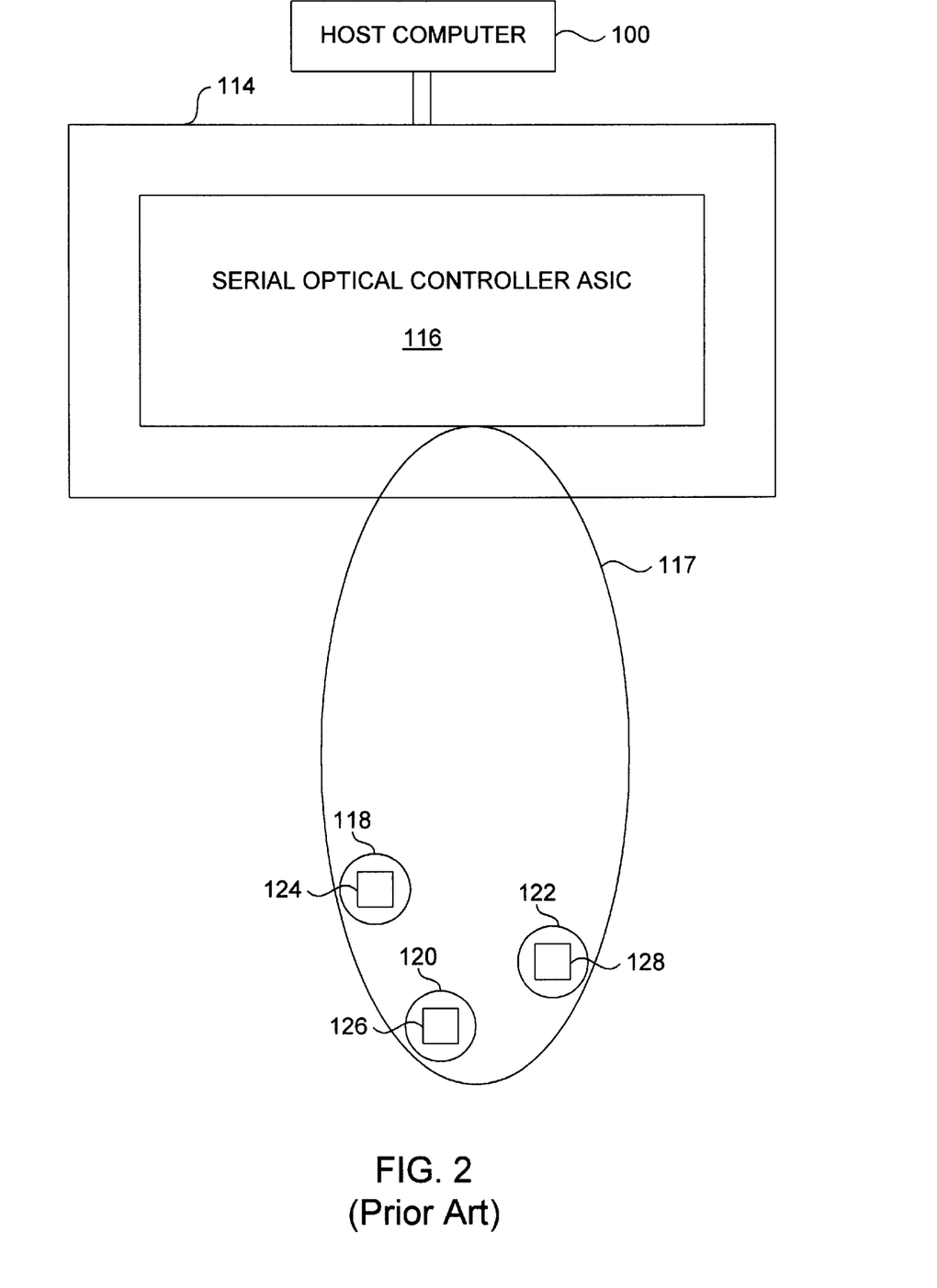
FIG. 2 is a block diagram of a representative serial optical control, including the fiber channel loop to which it is attached.

FIG. 2 shows a block diagram of a prior art host adapter card 114 suitable for use with host computer system 100. Host adapter card 114, which may be for example coupled with bus 102 of the computer system of FIG. 1, represents the interface circuit between host computer system 100 with a fiber channel loop 117. As shown, host adapter card 114 includes a serial optical controller 116, which facilitates communication between host computer system 100 and nodes 118, 120, and 122 via fiber channel loop 117. Nodes 118, 120, and 122 include devices 124, 126, and 128 respectively.

Communication over fiber channel loop 117 is typically achieved in the serial domain, i.e., data frames are transmitted serially on the fiber channel loop. Accordingly, it is typically the case that only one node on fiber channel loop 117 may transmit at a time. However, each device at each node on fiber channel loop 117, including host computer system 100, may implement point to point communication with one other node on fiber channel loop 117 or may simultaneously broadcast to a number of other nodes on fiber channel loop 117.

To gain access to fiber channel loop 117 for transmission purposes, each device on the fiber channel loop must arbitrate for access. By way of example, serial optical controller 116 of host adapter card 114 may be employed to arbitrate on behalf of host computer system 100. To facilitate arbitration, each of host computer system 100 and nodes 118, 120, and 122 may be associated with an arbitration loop physical address (ALPA).

During arbitration, the arbitration loop physical address (ALPA) identifies the identity and priority of each device on the fiber channel loop, thereby permitting other devices to ascertain, in accordance with some predefined priority scheme, which of the multiple competing devices may win mastership of the fiber channel loop. During communication establishment, the arbitration loop physical address (ALPA) identifies the destination of each data frames. By inspecting the ALPA, a particular device on the fiber channel loop can ascertain during communication establishment whether it is the target of a particular data frame, thereby allowing it to respond appropriately.

As mentioned earlier, arbitration refers to the process wherein a device on the fiber channel loop requests mastership of the loop for transmission purpose. With reference to FIG. 2, arbitration may begin when host computer 100 instructs serial optical controller 116 to send out on the loop an ARBITRATION primitive which contains the ALPA of the host. At the same time, or even earlier in time, other nodes in the loop may have sent out similar ARBITRATION primitives of their own, which include their own ALPA's.

The ARBITRATION primitives of these other nodes are examined by serial optical controller 116 as they are received for the purpose of deciding whether these other ARBITRATION primitives have a higher priority and should therefore win mastership over the ARBITRATION primitive of serial optical controller 116 or whether they have a lower priority and should therefore yield mastership to serial optical controller 116.

By way of example, serial optical controller 116 may examine the ALPA of each ARBITRATION primitive that it receives from the loop. If the ALPA of the examined ARBITRATION primitive has a higher value than its own (i.e., lower in priority) and serial optical controller is competing for mastership of the loop at the same time, serial optical controller 116 simply does not pass on the examined ARBITRATION primitive to the next node in the loop. In this manner, the lower priority ARBITRATION primitive is discarded at serial optical controller 116.

On the other hand, if the ALPA of the examined ARBITRATION primitive has a lower value than its own (i.e., higher in priority), serial optical controller 116 may pass on the ARBITRATION primitive to the next node in the loop. Other nodes in the loop behave similarly, resulting in the ARBITRATION primitive of serial optical controller 116 being either discarded along the way by one of the nodes seeking mastership (and having a higher priority) or in the ARBITRATION primitive of serial optical controller 116 making it all the way around the loop back to serial optical controller 116. If the ARBITRATION primitive of serial optical controller 116 makes it all the way back to serial optical controller 116, host computer 100 knows that it has the highest priority among all the nodes seeking mastership, i.e., it has won arbitration.

Once host computer 100 ascertains that it has won mastership of the loop, host computer 100 and serial optical controller begins to establish communication with its target node (a disk array 124 on the node, for example) by assembling an OPEN primitive to be sent out on the loop. At this point, host computer 100 has mastership and no other nodes (except host computer 100 and its target) may transmit (since each of them knows this current state) until host computer 100 relinquishes mastership.

The OPEN primitive typically includes the identity, e.g., the ALPA, of the target node. If the ALPA is valid and if the target node can respond, the target node will acknowledge with a READY primitive in response to the OPEN primitive from serial optical controller 116. If the response, i.e., the READY primitive, is received by serial optical controller 116, the initiator (i.e., host computer 100) and the target node are now in respective OPEN and OPENED states. In these states, host computer 100 may transmit one or more data frames to the target node.

Once transmission is completed with the data frame, serial optical controller 116 may issue a CLOSE primitive to inform other nodes, including the target node, that host computer 100 has finished transmission for now and is relinquishing mastership of the loop. Serial optical controller 116 may issue the CLOSE primitive because there is no more data to be transmitted, or simply because a communication bottleneck at either host computer 100 or the target node makes it inefficient to continue hang on to mastership of the loop. In this latter case, serial optical controller may release mastership to permit the loop to be used by other nodes for transmission purposes until the communication bottleneck is resolved.

Although the prior art sequence of arbitration and subsequent communication control (i.e., communication establishment and communication termination) works adequately, there are disadvantages. For example, most prior art serial optical controller and/or host computer 100 employ software to monitor the primitives on the loop for the purpose of determining whether arbitration has been won. Software techniques, while being adaptable to work with various versions of serial optical controller 116 and being upgradable nevertheless suffers in the area of operating speed. While the software speed limitation is a relatively insignificant factor for slower communication speeds on the loop, it becomes a major problem when the transmission speed of the various nodes increases and the loop is expected to handle higher data rates.

Compounded to the problem is the serial nature of the prior art's handling of the arbitration and communication establishment sequence. In the typical case, the CPU (whether at the host computer or resident on the serial optical controller) running the software evaluates each received ARBITRATION primitive to determine whether host computer 100 has won arbitration. Once that CPU ascertains that arbitration has been won, the same CPU is then employed to assemble the OPEN primitive for transmitting to the desired target device. As can be appreciated by those in the art, a time lag invariably occurs between the receipt of the returning ARBITRATION primitive (which really indicates mastership of the loop) and the time the OPEN primitive is sent out to prepare the target device for receipt of data frames. If the data rate on the loop is fairly slow, the time lag may be tolerated without undue penalty on performance. As demand for transmission bandwidth on the loop increases (e.g., due to increasing transmission speeds of the various devices on the loop or due to an increase in the number of devices connected to the loop), this time lag becomes a major bottleneck to communication efficiency.

In view of the foregoing, there are desired improved apparatus and methods therefor that are capable of efficiently and automatically arbitrating and establishing communication control on behalf of an electronic device on a fiber channel loop.

SUMMARY OF THE INVENTION

The present invention relates, in one embodiment, to a method for automatically arbitrating for mastership of a fiber channel loop in a host adapter circuit configured for coupling a host electronic device with the fiber channel loop. The host adapter circuit has a processor and a loop control circuit different from the processor. The loop control circuit is coupled to a memory of the host adapter circuit. The method includes sending out a host ARBITRATE primitive on the fiber channel loop. The method further includes employing the loop control circuit to monitor received ARBITRATE primitives received at the host adapter circuit from the fiber channel loop. There is also included ascertaining, using the loop control circuit, whether one of the received ARBITRATE primitives represents the host ARBITRATE primitive sent out previously. If the one of the received ARBITRATE primitives represents the host ARBITRATE primitive sent out previously, the method includes placing a target device coupled to the fiber channel loop in an OPENED state for receiving data from the host electronic device.

In another embodiment, the invention relates to a method for automatically terminating communication with a target device coupled to a fiber channel loop in a host adapter circuit configured for coupling a host electronic device with the fiber channel loop. The host adapter circuit has a processor and a loop control circuit different from the processor. The loop control circuit is coupled to a first memory of the host adapter circuit and to a transmit buffer of the host adapter circuit. The method includes sending out a first data frame from the host electronic device to the target device. The method further includes detecting in one of the first memory and the transmit buffer for a presence of a complete second data frame having a second data frame destination that is the same as an arbitration loop physical address (ALPA) of the target device. If the complete second data frame is not detected, the method also includes sending out a CLOSE primitive from the loop control circuit to the target device to terminate the communication.

These and other advantages of the present invention will become apparent upon reading the following detailed descriptions and studying the various figures of the drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the invention, improved arbitration and communication control techniques are provided to permit a host electronic device to arbitrate for mastership of the fiber channel loop in a highly automatic and efficient manner. In accordance with one embodiment of the present invention, a dedicated loop control circuit, which is separate from the CPU on the serial optical controller circuit, is provided to handle arbitration and communication control tasks. The loop control circuit, being implemented as dedicated hardware, substantially offloads these tasks from the processor, thereby permitting the designer to employ a simpler and less complicated processor in the serial optical controller circuit.

More importantly, the dedicated loop control circuit is advantageously disposed in the data path through the serial optical controller such that it monitors all ARBITRATE primitives traversing the serial optical controller without much assistance from the CPU. If the serial optical controller previously sent out its own ARBITRATE primitive to ask for mastership of the loop, the dedicated loop control circuit is configured to automatically place the node representative of the host electronic device into mastership of the loop upon detecting the returning ARBITRATE primitive of the host electronic device. In this manner, very little, if any, CPU bandwidth is required to handle the arbitration task.

In accordance with one aspect of the present invention, the dedicated loop control logic is configured to assemble the OPEN primitive automatically in anticipation of winning the arbitration. Once arbitration is won, the OPEN primitive containing the ALPA of the target device is immediately sent out to the loop to place the target device in the proper state to receive data frames (e.g., the OPENED state) without any lag time. Again, since CPU bandwidth and/or software techniques are not employed, any lag time between the time the host electronic device's own ARBITRATE primitive is received back at the serial optical controller and the time an OPEN primitive can be assembled and sent out on the loop to the target device is substantially minimized.

In accordance with another aspect of the present invention, the dedicated loop control logic circuit is configured to monitor the number of data frames available and ready to be transmitted from the host adapter card to the target device. If there is an insufficient number of data frames available and ready to be transmitted to the opened target device, the dedicated loop control logic circuit then terminates the transmission session, i.e., assembles and sends a CLOSE primitive to take the target device out of its opened state and relinquishes mastership of the loop in order to permit other devices to employ the loop for their own transmission. Once there are more data frames available and ready to be transmitted, the dedicated loop control logic circuit may arbitrate at the next available opportunity to again ask for mastership of the loop to resume communication. As can be appreciated from the foregoing, the use of the dedicated loop control logic circuit permits the serial optical controller to arbitrate, establish communication, and terminate communication in a highly automatic and efficient manner without requiring a substantial amount of assistance from the CPU.

Figure 3:
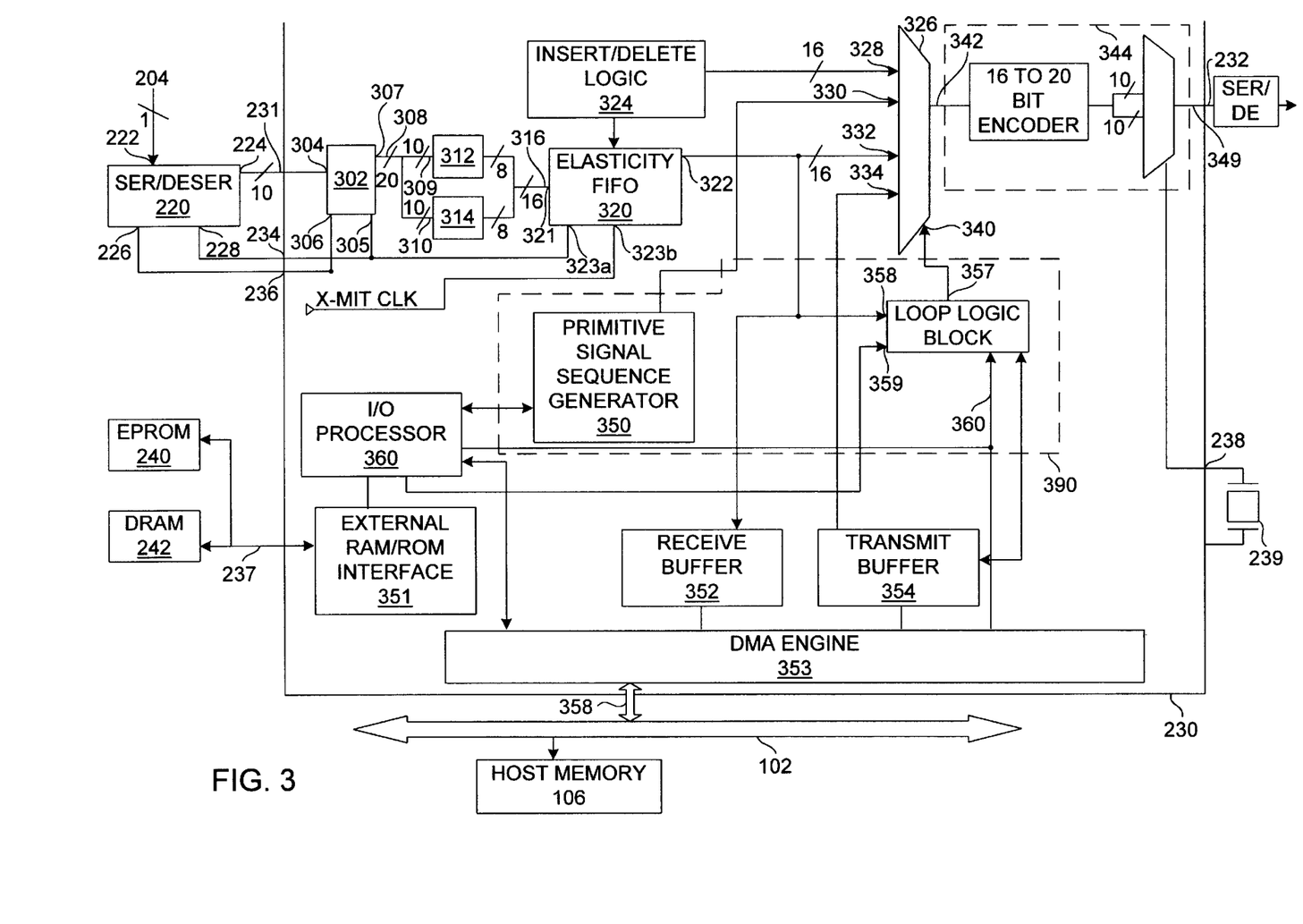
FIG. 3 illustrates, in accordance with one embodiment of the present invention, a serial optical controller, including the inventive loop control circuit.

To further illustrate the features and advantages of the present invention, FIG. 3 illustrates, in accordance with one embodiment of the present invention, a block diagram of a serial optical controller (SOC) 230, representing a serial optical controller suitable for implementing the inventive automatic arbitration and communication control technique. In the preferred embodiment, SOC 230 is implemented using an Application Specific Integrated Circuit (ASIC) chip although any other suitable implementation is equally acceptable. As shown in FIG. 3, SOC 230 is coupled at its left hand side to a serializer/deserializer (SER/DE) circuit 220, whose function is to translate the serial data frames received from loop input 204 into parallel 10-bit data input 231. SER/DE circuit 220, although typically provided as a separate circuit, may, in some cases, be implemented as part of SOC 230 itself.

The data frames received from the loop may, for example, have a data rate of about 1.06 Gbits/sec. The 10-bit data path out of SER/DE 220, being split into 10 parallel bits, may have a data rate of, for example, 106 MHz. The 10-bit data input is coupled to holding stage 302. Holding stage 302 provides a ten-bit-to-twenty-bit conversion of the 10-bit parallel signal received via SER/DE 220 to slow down the data rate even further to allow SOC 230 time to process the data. Holding stage 302 may be implemented using, for example, registers. Note that holding stage 302 may be omitted if SOC 230 can handle the data rate out of SER/DE 220 without requiring holding stage 302 to further slow it down.

Holding stage 302 includes a first clock input 305 coupled to receive the first receive clock signal via first receive clock input 234 of SOC 230. Holding stage 302 also includes a second clock input 306 coupled to receive the second receive clock signal (which is typically the complement of first clock signal) via second receive clock input 236 SOC 230. These clock signals permit holding stage 302 to synchronize the deserialized fiber channel signal, received at fiber channel input 231 of SOC 230, to the receive clock signals derived from SER/DE 220.

Holding stage 302 includes an output 307 coupled to provide a 20-bit parallel data signal to a 20-bit bus 308. Bus 308 is split into a first 10-bit bus 309 and a second 10-bit bus 310. Bus 309 provides a first 10-bit signal at a data rate of 53.1 MHz to a first ten-bit-to-eight-bit decoder 312. Bus 310 provides a second 10-bit signal at a data rate of 53.1 MHz to a second ten-bit-to-eight-bit decoder 314. Each of first and second ten-bit-to-eight-bit decoders 312 and 314 includes an output coupled to provide an 8-bit signal at a data rate of 53.1 MHz to a 16 bit bus 316.

A data input 321 of an elasticity FIFO 320 is coupled to receive the two eight-bit signals from decoders 312 and 314 in parallel via the 16 bit bus 316. A data output 322 of elasticity FIFO 320 is coupled to provide a FIFO output signal to a multiplexer 326, a loop control block 356, and a receive buffer 352. A first clock input 323a of elasticity FIFO 320 is coupled to receive the first receive clock signal via first receive clock input 234 of SOC 230. A second clock input 323b of elasticity FIFO 320 is coupled to the transmit clock 323b derived from oscillator 239.

Elasticity FIFO 320 cooperates with insert/delete logic 324 to provide elasticity between the deserialized fiber channel signal received at fiber channel input 231 and the fiber channel transmit signal transmitted from fiber channel output 232 of SOC 230. As mentioned, the deserialized fiber channel input signal, received at fiber channel input 231, is synchronized to the receive clock signals derived from serializer/deserializer 220. Meanwhile, the fiber channel output signal transmitted from fiber channel output 232, being in the transmit domain, is synchronized to transmit clock generator 239 (i.e., a clock crystal circuit). In one embodiment, clock generator circuit 239 generates a 53.1 MHz clock signal, which is employed to clock out 2 10-bit bytes every clock cycle. Accordingly, 10 bit is output at the frequency of 106 MHz, which conforms to the specification of the fiber channel loop specification. It should be understood that prior to being put on the loop, the parallel data out of 232 is serialized using a conventional serializer/deserializer to ensure that the output is in the serial format suitable for transmission on the loop.

Ideally, the receive clock signals and the transmit clock signal should be synchronous with each other. However, the first and second receive clock signals, derived from serializer/deserializer 220, are not perfectly synchronous with the transmit clock signal provided by transmit clock generator 239. By way of example, a tolerance of about of +/−0.003% or more is not uncommon.

Elasticity FIFO 320 cooperates with insert/delete logic 324 to insert or delete non-critical (i.e., dummy) data into the data stream in elasticity FIFO 320 in order to synchronize the deserialized fiber channel input signal, received at fiber channel input 231, with the fiber channel output signal provided at fiber channel output 232. The non-critical data may be inserted or deleted, for example, between data frames. In this manner, data may be input into FIFO 320 in the receive clock domain and output therefrom in the transmit clock domain. In an embodiment of the present invention, there may be up to six fill words between each frame of data. Fill words comprise non-critical data and includes, for example, no operation (NOS) signals, off line (OLS) signals, and other redundant non-critical data signals. FIFO 320 is typically sized appropriately taken into account the data rate on the loop.

SOC 230 further includes a data select multiplexer 326. Data select multiplexer 326 includes a first multiplexer input 328, a second multiplexer input 330, a third multiplexer input 332, a fourth multiplexer input 334, and a fifth multiplexer input 336, and a multiplexer output 342. Multiplexer output line 342 is coupled to an encoder circuit 344 to reverse the earlier decoding process and to furnish 10-bit wide data to output 232.

The selection of which data input is coupled to output 342 is determined by data provided via a multiplexer control input 340. As shown in FIG. 3, first multiplexer input 328 of data select multiplexer 326 is coupled to receive a 16-bit signal from an output of insert/delete logic 324. In one embodiment primitive signal sequence generator 350 may be employed to generate certain fillword primitives (such as no operation, offline, and others). The primitives are generated to satisfy the requirements of the arbitration loop protocol rules, which typically require that only valid primitive signals or characters be transmitted on the fiber channel loop. Second multiplexer input 330 is coupled to receive a signal from an output of a primitive signal sequence generator 350.

Primitive signal sequence generator 350, which is part of the inventive loop control circuit 390, represents the circuitry responsible for assembling certain primitives for transmission on the loop, thereby alleviating processor 360 (the CPU) of this task. In one embodiment, primitive signal sequence generator 350 may be coupled to a DRAM 242 to generate the OPEN primitive on behalf of the host computer. This aspect of the invention will be discussed in detail later herein. Primitive signal sequence generator 350 may also be employed, in one embodiment, to assemble data to be transmitted into the primitive format for transmission on the loop.

Third multiplexer input 332 is coupled to receive data from output 322 of elasticity FIFO 320. As mentioned earlier, the data received at third multiplexer input 332 typically represents data received from the loop after it has been processed via SER/DE 220, holding stage 302, decoders 312/314, and elasticity FIFO 320. Fourth multiplexer input 334 is coupled to receive a data signal from an output of a transmit buffer 354. By selecting fourth multiplexer input 334 (by providing appropriate data on multiplexer control input 340) multiplexer 326 may output data from transmit buffer 354 (which in turn receives its data from the host computer) to multiplexer output 342 and subsequently to fiber channel output 232 of SOC 230. Multiplexer control input 340 is coupled to also receive a control signal from a control output 357 of loop logic block 356.

Transmit buffer 354 is used to buffer data to be transmitted from the host computer to the fiber channel loop via fiber channel output 232 of SOC 230. Analogously, receive buffer 352 is used to buffer data received from loop input 204 (after it has been processed via SER/DE 220, holding stage 302, decoders 312/314, and elasticity FIFO 320). As shown in FIG. 3, these buffers are coupled to direct memory access (DMA) engine 353 for coupling to host memory (e.g., RAM 106 of FIG. 1) via bus 102 (which may be, for example, a SCSI bus or an S-bus).

In FIG. 3, there is shown a processor 360, representing the processor responsible for overseeing the data transmission process between the host computer and the loop as well as the general functioning of the host adapter card. By way of example, processor 360 may be responsible for general environmental functions (such as performance monitoring and error checking) as well as interface functions (e.g., by displaying data to diodes or a display screen to inform the computer user of the communication status).

Processor 360 of SOC 230 is shown coupled to an external RAM/ROM interface 351 to communicate with DRAM 242 and EPROM 240 via a bus 237. EPROM 240 typically stores data for initializing SOC 230 upon startup. DRAM 242 stores, among others, data for transmission from the host computer to the device(s) on the loop. In one embodiment, the data themselves reside in host memory 106 and only pointers (which may be organized as linked lists) thereto are stored in DRAM 242 to advantageously reduce the amount of storage required on the host adapter card (which minimizes the area/costs required for implementing the host adapter card). By way of example, if the host computer would like to output data to a particular node, it may simply provide the address and the node identity so that the ALPA and pointers can be constructed (e.g., by I/O processor 360) within DRAM 242. DRAM 242 and/or EPROM 240 may be implemented as circuits external to SOC 230 (as shown in FIG. 3) or it may be provided within the ASIC that implements SOC 230.

Host memory 106 is accessible to SOC 230 via bus 102. Once mastership of the bus is achieved and the destination node is in the proper state (e.g., OPENED) for receiving data, I/O processor 360 may instruct loop logic block 356 to select multiplexer input 334 to permit data to be sent from transmit buffer 354 to SOC output 232 (via encoder 344). This data is typically obtained directly from host memory 106 by DMA engine 353 in accordance to the list of pointers within DRAM 242. Prior to transmission, the data may be encoded into frames suitable for transmission on the loop. In one embodiment, a frame may include, for example, up to about 2400 bytes of data.

Data received from the loop is received by receive buffer 352 from FIFO 320 (the function of which has been described earlier). Once received in receive buffer 352, DMA engine 353 will output the data to the host computer (via bus 102).

Figure 4:
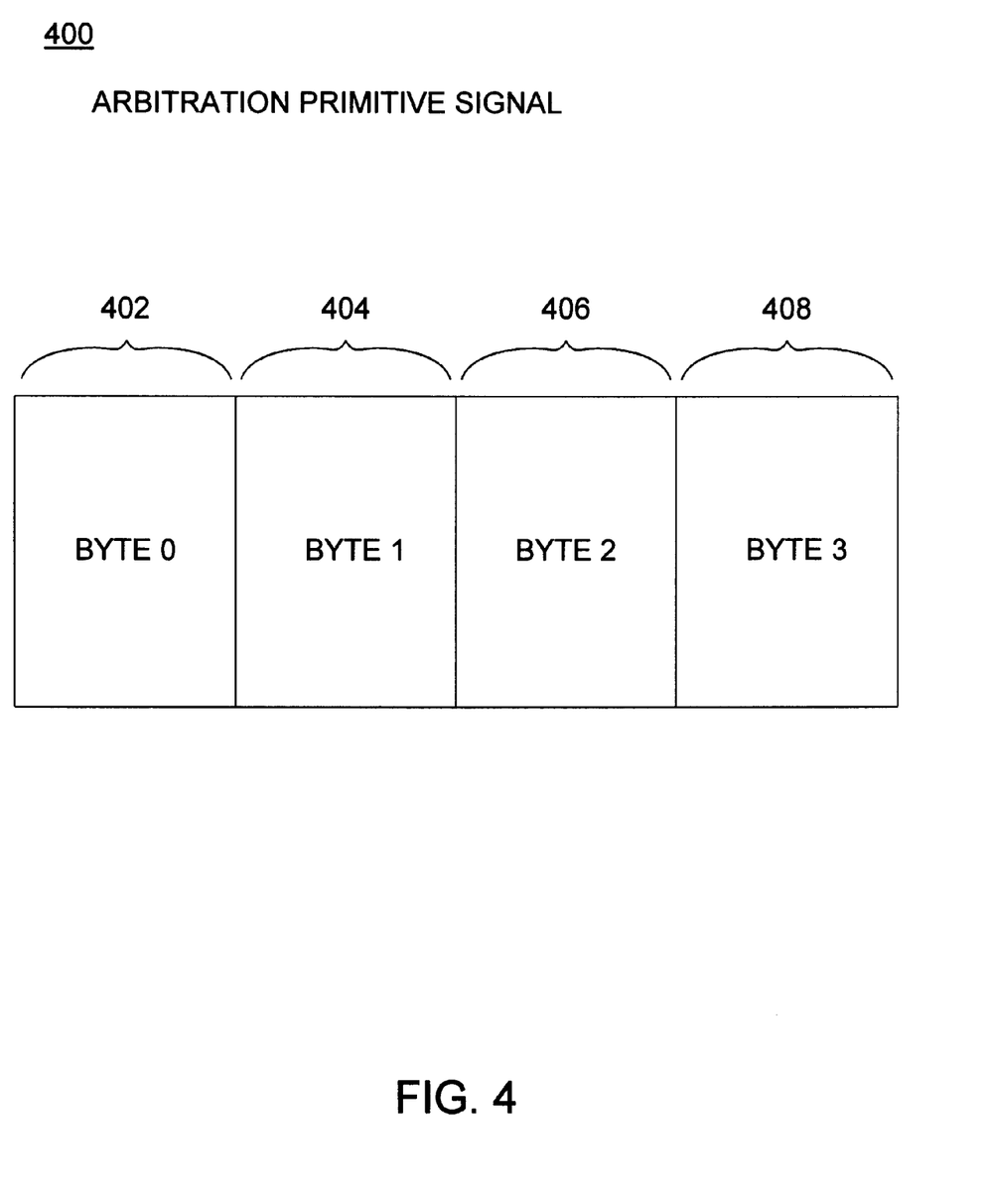
FIG. 4 is a block diagram illustrating, in accordance with one embodiment of the invention, a structure of an ARBITRATION primitive signal for use arbitrating for loop access.

With reference to FIG. 4, a block diagram of an ARBITRATION primitive signal 400 is shown in accordance with one embodiment of the present invention. ARBITRATION primitive signal 400 includes a first arbitration byte 402, a second arbitration byte 404, a third arbitration byte 406, and a fourth arbitration byte 408.

First and second arbitration bytes 402 and 404 typically identify primitive signal 400 as an ARBITRATION primitive signal. Third and fourth arbitration bytes 406 and 408 typically indicate the arbitration loop physical address, ALPA, of the source of ARBITRATION primitive signal 400, and the type of arbitration required for ARBITRATION primitive signal 400. For an ARBITRATION primitive signal 400, no destination address may be needed because ARBITRATION primitive signal 400 is communicated to each node of the fiber channel loop on behalf of the corresponding initiator device.

Each of bytes 402, 404, 406, and 408 of ARBITRATION primitive signal 400 may include 10 bits while ARBITRATION primitive signal 400 propagates on the fiber channel loop. Auto-receive logic elements 302, 312, and 314 of SOC 230 (FIG. 3) decode ARBITRATION primitive signal 400 (FIG. 4) so that each byte includes 8 bits while ARBITRATION primitive signal propagates through SOC 230 (FIG. 3).

Figure 5:
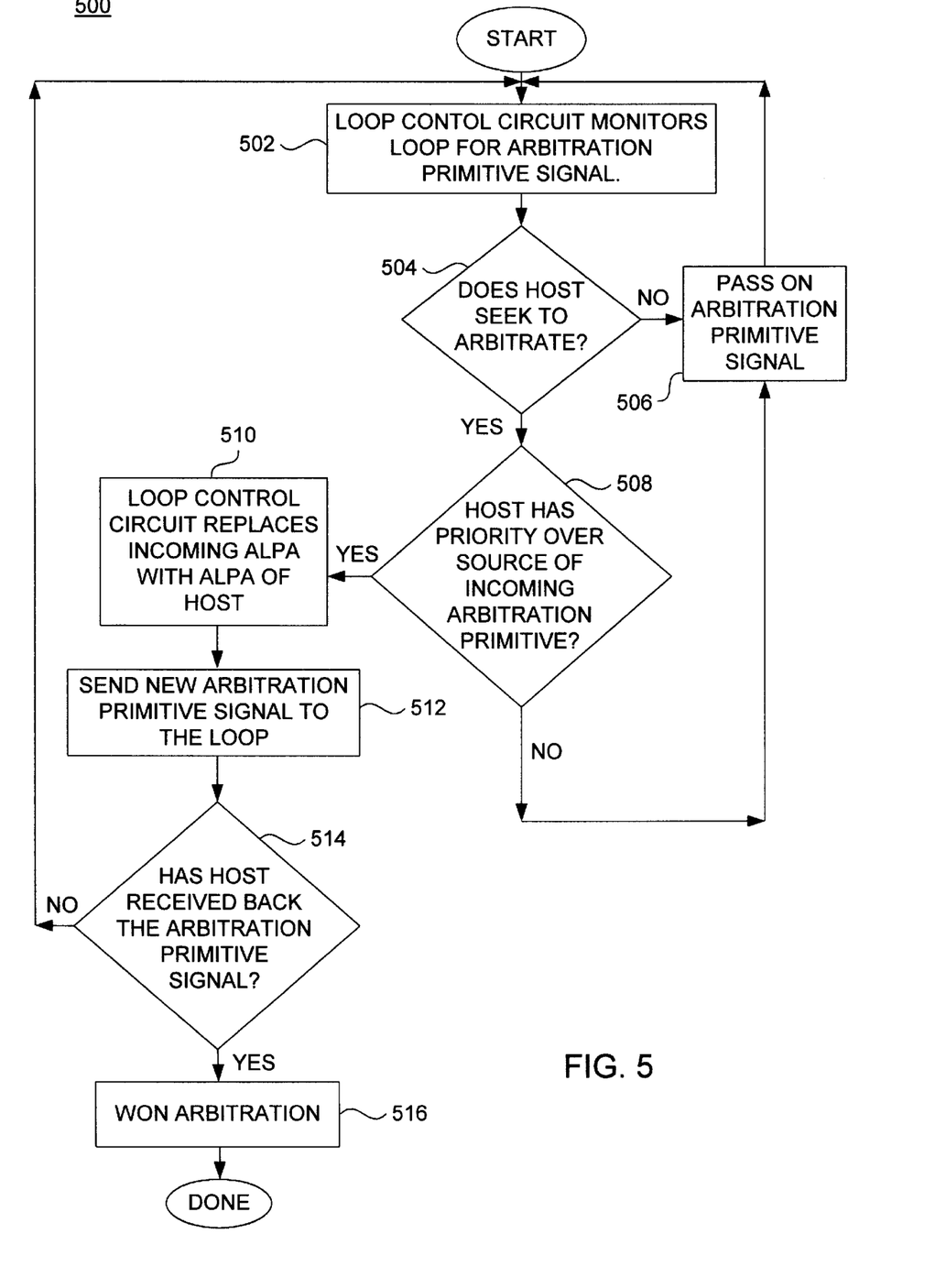
FIG. 5 illustrates, in one embodiment of the present invention, a logic flow diagram of the auto-arbitration process.

With reference to FIG. 5, a logic flow diagram is shown of a process 500 for monitoring the fiber channel loop and arbitrating on behalf of the host electronic device according to principles of the present invention. As previously mentioned, the host electronic device may be host computer system 100 (FIG. 1) or any other device coupled to communicate via the fiber channel loop.

In step 502 of process 500, loop logic 356 (FIG. 3) monitors the fiber channel loop for ARBITRATION primitive signals received from initiator nodes of the fiber channel loop. As mentioned, input 358 (FIG. 3) of loop logic 356 is coupled to receive a deserialized fiber channel data signal from data output 322 of elasticity FIFO 320. When SOC 230 receives an ARBITRATION primitive signal, loop logic 356 reads the ALPA of the initiator device from third and fourth bytes 406 and 408 of the corresponding ARBITRATION primitive signal.

In step 504 of process 500 (FIG. 5), loop logic 356 (FIG. 3) determines whether SOC 230 currently seeks to arbitrate. By way of example, loop logic 356 may be informed previously via signal 359 that SOC 230 seeks to arbitrate. In one embodiment, signal 359 may be asserted by processor 360 as soon as it sees stored pointers pointing to data to be transmitted (the data itself may be stored in host memory 106).

If it is determined in step 504 (FIG. 5) that the host electronic device does not currently seek to arbitrate, processing according to process 500 proceeds to step 506. In step 506, SOC 230 (FIG. 3) sends the received ARBITRATION primitive signal back to the fiber channel loop to be passed on to the next node in the loop. By way of example, loop logic 356 may couple, via control input 340 into multiplexer 326, multiplexer input 332 with multiplexer output 342 to allow the received ARBITRATION primitive signal to pass through. Alternatively, loop logic 356 may provide a copy of the received ARBITRATION primitive signal to multiplexer 326 via multiplexer input 336. It then couples, via control input 340 into multiplexer 326, this multiplexer input 336 with multiplexer output 342 to send the copy of the received ARBITRATION primitive signal to the next node on the loop.

If it is determined in step 504 (FIG. 5) that the host electronic device currently seeks to arbitrate, processing according to process 500 proceeds to step 508. In step 508, loop logic 356 (FIG. 3) determines arbitration priority between the host electronic device and the initiator device, from which the received ARBITRATION primitive signal was transmitted, by comparing the ALPA of the host electronic device to the ALPA of the initiator device. Priority is determined according to a priority list indexed by the ALPA's of each node on the fiber channel loop. In one embodiment of the present invention, an ALPA having a lower value has a lower priority. In another embodiment of the present invention, an ALPA having a lower value has a higher priority.

If it is determined in step 508 that the host electronic device does not have priority over the source of the incoming ARBITRATION primitive signal, processing according to process 500 proceeds to step 506 in which SOC 230 passes the received ARBITRATION primitive signal to the next node (in the manner described above in connection with step 506).

On the other hand, if it is determined in step 508 (FIG. 5) that the host electronic device has priority over the source of the incoming ARBITRATION signal, processing according to process 500 proceeds to step 510. In step 510, loop logic 356 may simply discard the received ARBITRATION primitive signal, e.g., by not allowing multiplexer 326 to pass the received ARBITRATION signal on to the next node.

Alternatively, loop logic 356 may replace the ALPA of the incoming ARBITRATION signal with the ALPA of the host electronic device. By replacing the ALPA of the incoming ARBITRATION signal with the ALPA of the host electronic device, loop logic 356 in effect creates a new ARBITRATION primitive signal. Loop logic 356 (FIG. 3) may then send, in step 512, the new ARBITRATION primitive signal for transmission to the fiber channel loop via fiber channel output 232 of SOC 230. Control output 357 (FIG. 3) of loop logic 356 provides a control signal to control input 340 of data select multiplexer 326 to select multiplexer input 336 which is coupled to receive the signal from output 355 of loop logic 356.

In step 514 of process 500 (FIG. 5), loop logic 356 (FIG. 3) determines whether the ARBITRATION primitive signal sent previously by the host electronic device to the fiber channel loop has been received back at the host electronic device. If the host electronic device has not received its own ARBITRATION primitive back from the fiber channel loop, processing according to process 500 (FIG. 5) returns to step 502 to continue monitoring the loop.

If the host electronic device receives its own ARBITRATION primitive back from the fiber channel loop, processing according to process 500 proceeds to step 516 in which loop logic 356 determines that the host electronic device has won arbitration mastership over the fiber channel loop. After winning arbitration mastership, SOC 230 proceeds to place the target device into the proper state for receiving data. In one embodiment, SOC 230 also informs other nodes of its status as the arbitration winner to prevent other nodes from interfering with the subsequent transmission until SOC 230 relinquishes mastership of the loop.

As can be appreciated from the foregoing, loop logic block 356 substantially relieves processor 360 of the task of arbitrating for access, e.g., of monitoring the incoming ARBITRATE primitives for the purpose of determining whether arbitration had been won and of handling ARBITRATE primitives from other nodes while arbitration is in progress. As mentioned earlier, the fact that this task is offloaded from the processor permits the designer to provide a simpler and less complex processor in SOC 230. As a further advantage, delay is substantially minimized as loop logic block 356 is a circuit dedicated to the task, unlike general purpose processor 360 which may be busy with other tasks before it can attend to tasks related to arbitration. Further, loop logic block is implemented in hardware, which enables SOC 230 to quickly determine whether it has arbitration priority and either pass on the received ARBITRATE primitive or to suppress it. These compound advantages substantially improves the responsiveness of SOC 230 in the arbitration process, rendering SOC 230 more suitable for use with modem high speed fiber channel loops.

In accordance with one aspect of the present invention, the loop control circuit 390 assembles in advance the OPEN primitive in anticipation of winning arbitration. The OPEN primitive may be substantially similar in structure to the ARBITRATE primitive discussed in FIG. 4 in that the first two bytes identify the primitive as an OPEN primitive. The third and fourth bytes may be employed to indicate the identity of the initiator node and the target node, e.g., their ALPA's. In one embodiment, the OPEN primitive is formed by primitive signal sequence generator 350. In another embodiment, the OPEN primitive is formed by loop logic block 356.

Advance assembly of the OPEN primitive is made possible by the fact that DRAM 242 already stores, along with the pointers to data in host memory 106, the identity of the target node. In the typical case, DRAM 242 may store multiple (up to 50 or even more) linked lists of pointers (either as separate lists or as a single list) to corresponding memory locations in host memory 106. Each list may, for example, correspond to a data stream that the host computer wishes to transmit to a node on the loop. As the host computer obtains more data and puts them into the appropriate memory locations in host memory 106 for transmission, the linked lists are updated. These linked lists are then employed by processor and/or DMA engine 353 during communication to select data from host memory 106 to receive into transmit buffer 354 for transmission to a node on the loop.

At any rate, the loop control circuit 390 takes advantage of the availability of the target identity at DRAM 242 to assemble in advance the OPEN primitive. In this manner, while the ARBITRATE primitive makes its way around the loop, the loop control circuit (with the cooperation of processor 360 in some cases) obtains the target node identity to ready the OPEN primitive. Once the ARBITRATE primitive sent by SOC 230 is received (indicating mastership of the loop is obtained), loop logic block 356 may immediate cause this OPEN primitive to be sent out on the loop. By way of example, loop logic block 356 may control multiplexer control input 340 to cause the OPEN primitive to be provided from input 336 (or input 330 if the OPEN primitive is assembled by primitive signal sequence generator 350) to multiplexer output 342 to be sent out on the loop to the target node.

As can be appreciated, the inventive loop control circuit automatically and efficiently handles communication establishment with minimum demand on the bandwidth of processor 360 and/or interference from processor 360. The fact that the OPEN primitive is assembled in advance substantially minimizes any delay between the time SOC 230 receives back its own ARBITRATE primitive (which indicates that the host has won arbitration) and the time SOC 230 sends out the OPEN primitive to ready the target node for receiving the subsequently transmitted data. The fact that communication establishment is handled by a dedicated hardware circuit, not by the software-running general purpose processor which may be busy with other tasks, substantially improves the speed with which SOC 230 can arbitrate for access and establish communication.

In another embodiment, the OPEN primitive may be assembled after the host's own ARBITRATE primitive is received back at SOC 230. Nevertheless, the assembly of the ARBITRATE primitive may still be done by loop control logic 390 (e.g., by loop logic 356) without requiring much interference from the processor. In this manner, advantages associated with using dedicated hardware for communication establishment are still maintained.

Once the initiator node and the target node are in the proper states for data transmission, e.g., OPEN and OPENED states respectively, processor 360 and/or DMA engine 253 may begin to employ the linked list of pointers in DRAM 242 to pull data out of host memory 106 to put the data into transmit buffer 354 for transmitting that data to the target node via the loop. It should be appreciated that transmit buffer 354 should be large enough to store a multiplicity of data frames (each of which may be, for example, 2000 bytes) to account for possible latencies on bus 102 since the host adapter card and SOC 230 do not have control over bus 102 of the host computer and may be preempted at any time by higher priority traffic on bus 102.

In one particularly advantageous embodiment, loop logic block 356 monitors transmit buffer 354 for the presence of a full frame and does not send the ARBITRATE request out if a full data frame is not yet buffered. This is to prevent the situation wherein arbitration is successful and both the initiator and target nodes are in their proper states for data transmission and yet there is not a full frame in transmit buffer 354 (due to, e.g., a busy bus 102) ready for transmission. This constraints advantageously eliminates inefficient usage of the loop's bandwidth since data is generally transmitted as a contiguous frame, and no data may be transmitted even if a partial frame is available in transmit buffer 354.

As mentioned earlier, the destination address may be pulled from DRAM 242 to ready the OPEN primitive in one embodiment. In another embodiment, the destination address could be obtained from the data frame in transmit buffer to ready the OPEN primitive.

In accordance with another aspect of the present invention, the loop control circuit also optimizes the transmission termination process by simultaneously monitoring both the linked list inside the DRAM 242 and the number of buffered frames inside transmit buffer 354 to decide whether a CLOSE primitive should be sent after the transmission of each data frame. The CLOSE primitive informs all nodes on the loop that the current initiator node is done with transmission and is going back to the monitoring state, freeing the loop up for arbitration again. In one embodiment, the CLOSE primitive may be substantially similar in structure to the ARBITRATE primitive of FIG. 4, with the first two bytes identifying the type of primitive (i.e., CLOSE) and the last two bytes identifying the initiator node (and in some cases also the target node).

In accordance with one embodiment of the invention, loop logic block monitors the linked list of pointers in DRAM 242 to determine whether the next data frame to be sent is destined for the same target node. Obviously, if there is no more data to be sent, there is no next data frame and loop control circuit 390 may immediately send out a CLOSE primitive after the current data frame is transmitted out on the loop.

If the next data frame to be sent is destined for the same target node (as a query to the linked list in DRAM 242 or transmit buffer 354 would reveal), loop logic block 356 may next query transmit buffer 354 to make sure that the next data frame is already buffered. This check ensures that no loop bandwidth is wasted while SOC 230 waits for data to be transmitted from host memory 106 to SOC 230 via bus 102. If the next data frame is already buffered, the CLOSE primitive is not sent and the next data frame may be sent after transmission of the current data frame is completed without closing the loop. On the other hand, if the next data frame is not buffered, loop logic block 356 may immediately send out a CLOSE primitive after the current data frame is transmitted out on the loop. In this manner, the loop may be freed up for use by other nodes and/or the host computer if it wins arbitration again, thereby minimizing wasted loop bandwidth in the event data transfer between host memory 106 and transmit buffer 354 is slow.

Once the CLOSE termination makes its way around the loop back to the initiator node, the initiator node may return to the monitor state again. From the monitor state, it may again arbitrate for access if there is additional data to be transmitted out on the loop.

As can be appreciated from the foregoing, the fact that communication termination is handled by the dedicated loop control circuit 390 further improves usage of the loop's bandwidth. Since communication termination is automatically handled by dedicated hardware, little intervention from processor 360 is required. As mentioned earlier, the offloading of tasks from processor 360 permits the designer to simplify the design of processor 360. Additionally, since the software-running general purpose processor is not employed to handle communication termination, delay associated therewith is substantially minimized. In this manner, SOC 230 may be rendered more suitable for use with modern high speed fiber channel loops.

Figure 6:
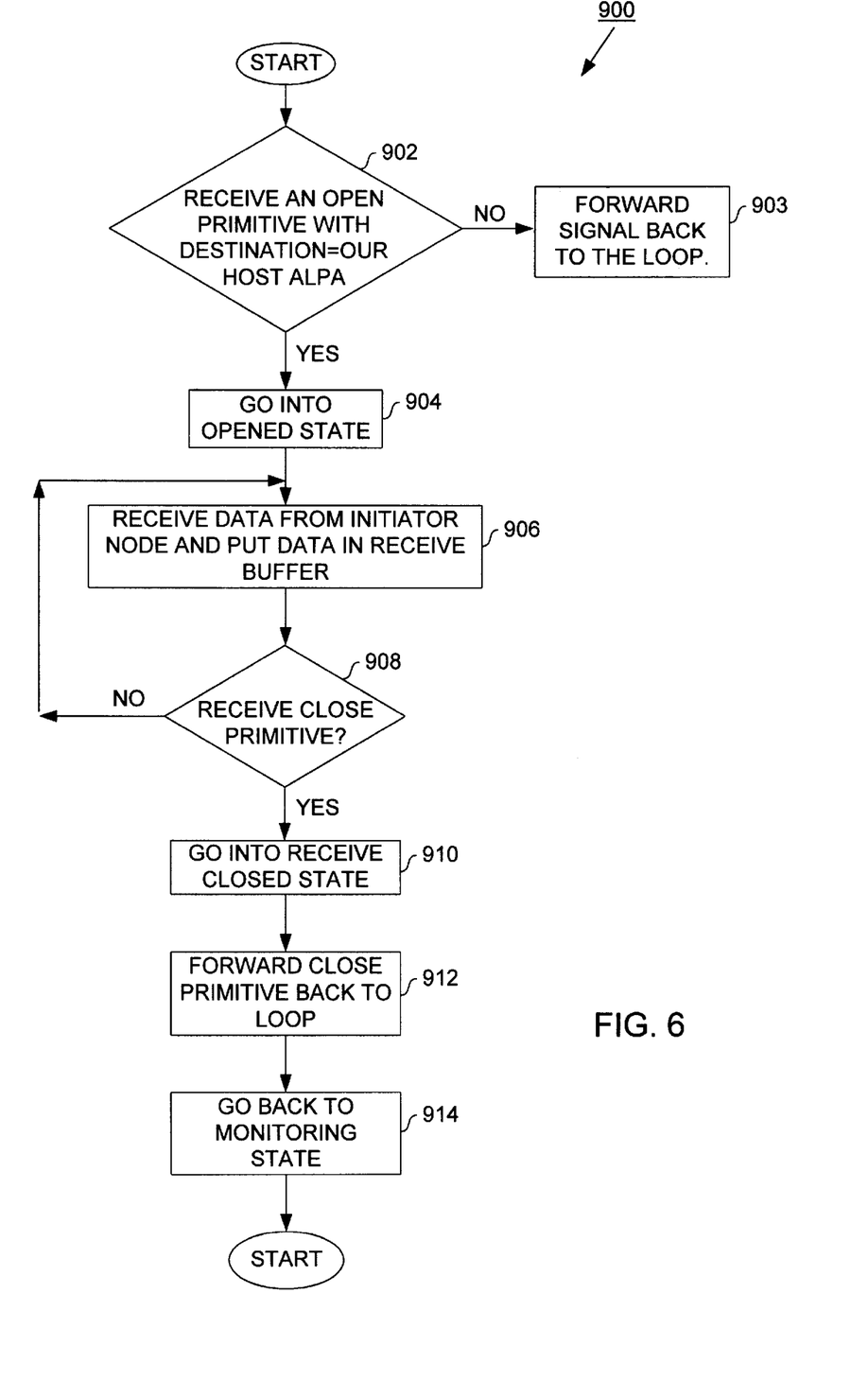
FIG. 6 illustrates, in one embodiment of the present invention, a logic flow diagram of the automatic communication termination process.

FIG. 6 is a flowchart illustrating, in accordance with one aspect of the present invention, the steps taken when the host adapter card is opened for receipt of data by another node on the loop acting as the initiator node. In step 902, SOC 230 receives an OPEN primitive signal from an initiator node via the fiber channel loop and ascertains whether the destination address (ALPA) of the received OPEN primitive signal is the ALPA of the host adapter card. With reference to FIG. 3, step 902 may be performed by loop logic block 356 automatically as it monitors deserialized loop data from output 322 of elasticity FIFO 320.

If the destination address (ALPA) of the received OPEN primitive signal is different from the ALPA of the host adapter card, the OPEN primitive is passed on to the next node via the loop. Note that this entire process of monitoring the deserialized data and deciding whether the ALPA matches may be done entirely by loop logic block 356 without intervention from processor 360.

On the other hand, if the destination address (ALPA) of the received OPEN primitive signal is the same as the ALPA of the host adapter card, loop logic 356 may then places SOC 230 goes into an OPENED state, thereby making it the target device. In one embodiment, if the Receive Buffer 352 has enough space for at least one frame, loop logic 356 may also automatically send out a READY primitive to complete the communication establishment process. The READY primitive signal may be assembled in advance, in one embodiment, in anticipation of being opened in order to save time when the OPEN primitive (with the host's ALPA) is received. Thereafter, SOC 230 goes into an OPENED state and prepares to receive data from the initiator node.

In step 906 of process 900, SOC 230 receives data from the initiator node. With reference to FIG. 3, receive buffer 352 receives the deserialized fiber channel signal from data output 322 of elasticity FIFO 320 (FIG. 3). In step 908 of process 900, loop logic 356 ascertains whether SOC 230 has received a CLOSE primitive signal from the initiator node.

If it is determined in step 908 that SOC 230 has not yet received a CLOSE primitive from the initiator node, the method proceeds back to step 906 continue receiving data from the initiator node.

On the other hand, if it is determined in step 908 that SOC 230 has received a CLOSE primitive from the initiator node, the method proceeds to step 910 in which SOC 230 goes into a CLOSED state. In step 912, SOC 230 forwards the CLOSE primitive back to the initiator node via the fiber channel loop. In step 914, SOC 230 goes back to the MONITORING state.

While this invention has been described in terms of several preferred embodiments, there are alterations, permutations, and equivalents which fall within the scope of this invention. It should be noted that while the inventive loop control circuit, including loop logic block 356 and primitive signal sequence generator 350, has been described extensively in connection with the particular SOC implementation of FIG. 3, the inventive loop control circuit may be adapted by those skilled in the art to work with other SOC implementation. The loop control circuit itself, whose functions, features, and advantages have been described in great detail herein, may be implemented using any suitable technology, including for example, combinational/state logic, programmable logic, ASIC logic, and the like. It is therefore intended that the following appended claims be interpreted as including all such alterations, permutations, and equivalents as fall within the true spirit and scope of the present invention.

What is claimed is:

1. In a host adapter circuit configured for coupling a host electronic device with a fiber channel loop, a method for automatically arbitrating for mastership of said fiber channel loop, said host adapter circuit having a processor and a loop control circuit different from said processor, said loop control circuit being coupled to a memory of said host adapter circuit, comprising:

sending out a host ARBITRATE primitive on said fiber channel loop;

employing said loop control circuit to monitor received ARBITRATE primitives received at said host adapter circuit from said fiber channel loop;

ascertaining, using said loop control circuit, whether one of said received ARBITRATE primitives represents said host ARBITRATE primitive sent out previously; and if said one of said received ARBITRATE primitives represents said host ARBITRATE primitive sent out previously, placing a target device coupled to said fiber channel loop in an OPENED state for receiving data from said host electronic device.

2. The method of claim 1 wherein said loop control circuit comprises a loop logic block configured to monitor said ARBITRATE primitives received from said fiber channel loop.

3. The method of claim 2 further comprising:

assembling an OPEN primitive, using said loop logic block, for sending to said target device via said fiber channel loop, said OPEN primitive being configured to place said target device in said OPENED state.

4. The method of claim 3 further comprising sending said OPEN primitive from said loop logic block to said target device via said fiber channel loop upon receiving said host ARBITRATE primitive sent out previously by said host electronic device.

5. The method of claim 3 wherein said OPEN primitive is assembled in advance prior to a receipt at said host adapter circuit of said host ARBITRATE primitive sent out previously by said host electronic device.

6. The method of claim 5 wherein said assembling said OPEN primitive comprises obtaining a target arbitration loop physical address (ALPA) from said memory of said host adapter circuit.

7. The method of claim 1 wherein said loop control circuit is implemented as part of an Application Specific Integrated Circuit.

8. The method of claim 7 wherein said Application Specific Integrated Circuit implements a serial optical controller of said host adapter circuit.

9. The method of claim 2 wherein said host ARBITRATE primitive is sent by said loop logic block.

10. In a host adapter circuit configured for coupling a host electronic device with a fiber channel loop, a method for automatically terminating communication with a target device coupled to said fiber channel loop, said host adapter circuit having a processor and a loop control circuit different from said processor, said loop control circuit being coupled to a first memory of said host adapter circuit and to a transmit buffer of said host adapter circuit, comprising:

sending out a first data frame from said host electronic device to said target device;

detecting in one of said first memory and said transmit buffer for a presence of a complete second data frame having a second data frame destination that is the same as an arbitration loop physical address (ALPA) of said target device;

if said complete second data frame is not detected, sending out a CLOSE primitive from said loop control circuit to said target device to terminate said communication.

11. The method of claim 10 wherein said CLOSE primitive is sent from said loop control circuit only if said complete second data frame is present in said transmit buffer.

12. The method of claim 10 wherein said first memory contains pointers to physical address locations in a second memory in said host electronic device, said physical address locations storing data to be sent to said target device.

13. The method of claim 10 wherein said loop control circuit includes a loop logic block configured to send said CLOSE primitive to said target device.

14. The method of claim 13 further comprising employing said loop logic block to form said CLOSE primitive.

15. The method of claim 14 further comprising employing said loop logic block to obtain an ALPA of said target device to form said CLOSE primitive.

16. The method of claim 15 wherein said ALPA of said target device is obtained from one of said first memory and said transmit buffer.

17. The method of claim 10 wherein said loop control circuit is implemented as part of an Application Specific Integrated Circuit.

18. A host adapter circuit configured for coupling a host electronic device with a fiber channel loop, said host adapter circuit being configured for automatically arbitrating for mastership of said fiber channel loop, said host adapter circuit having a processor and a loop control circuit different from said processor, said loop control circuit being coupled to a memory of said host adapter circuit, comprising:

means for sending a host ARBITRATE primitive on said fiber channel loop;

means for monitoring received ARBITRATE primitives received at said host adapter circuit from said fiber channel loop; and means, coupled to said monitoring means, for ascertaining, using said loop control circuit, whether one of said received ARBITRATE primitives represents said host ARBITRATE primitive sent out previously, wherein a target device coupled to said fiber channel loop is placed in an OPENED state for receiving data from said host electronic device if said one of said received ARBITRATE primitives represents said host ARBITRATE primitive sent out previously.

19. The host adapter circuit of claim 18 wherein said loop control circuit comprises a loop logic block configured to monitor said ARBITRATE primitives received from said fiber channel loop.

20. The host adapter circuit of claim 18 wherein said loop control circuit is implemented as part of an Application Specific Integrated Circuit.

* * * * *